United States Patent [19]

Persson et al.

[11] 3,838,265

[45] Sept. 24, 1974

[54] APPARATUSES FOR ILLUMINATING AN OPERATING ZONE WHICH IS OBSERVED BY MEANS OF AN OBSERVATION MIRROR

[75] Inventors: Ake Persson, Sollentuna; Folke Hedstrom, Stockholm, both of Sweden

[73] Assignee: SWE-PE-DENT AB, Handelsvagen, Danderyd, Sweden

[22] Filed: Nov. 9, 1973

[21] Appl. No.: 414,391

[30] Foreign Application Priority Data
Nov. 17, 1972  Sweden.............................. 15037/72

[52] U.S. Cl................ 240/1 LP, 240/1.4, 350/96 R
[51] Int. Cl........................................................ F21
[58] Field of Search............... 240/1 LP, 1.4, 41.15; 350/96 R

[56] References Cited
UNITED STATES PATENTS

| | | | |
|---|---|---|---|
| 3,255,342 | 6/1966 | Seitz et al. ........................ | 240/41.15 |
| 3,360,640 | 12/1967 | Seitz et al. ........................ | 240/1 LP |
| 3,433,940 | 3/1969 | Baez et al. ........................ | 350/96 R |
| 3,772,506 | 11/1973 | Junginger........................... | 240/1 EL |

*Primary Examiner*—Richard L. Moses

[57] ABSTRACT

An apparatus for illuminating an operating zone which is observed by means of an observation mirror of the type having a stem, includes a light-generating device from which the light is transmitted to the operating zone over a light conductor and reflecting means separate from the observation mirror. The light-generating means comprises a light source which is positioned in one focal point of a cold-light reflector which is part of an ellipsoid. A planar cold-light mirror is provided between said focal point and the other focal point of the ellipsoid and makes an angle with the axis of the ellipsoid such that the visible light is reflected toward a secondary focal point positioned outside the maximum focusing cone of the reflector, one end of the light conductor being disposed at the secondary focal point. The other end of the light conductor cooperates with the reflecting means the surface of which makes an angle with the longitudinal direction of the stem of the observation mirror such that the light coming from the reflecting means strikes the operating zone. The latter angle is so selected in relation to the angle of the observation mirror to the longitudinal direction of the stem that the operating area becomes visible in the observation mirror.

4 Claims, 2 Drawing Figures

PATENTED SEP 24 1974

3,838,265

APPARATUSES FOR ILLUMINATING AN OPERATING ZONE WHICH IS OBSERVED BY MEANS OF AN OBSERVATION MIRROR

This invention relates to an apparatus for illuminating an operating zone which is observed by means of an observation mirror of the type having a stem, use being made of light-generating means from which the light is transmitted to the operating zone over a light conductor and reflecting means separate from the observation mirror.

Prior art apparatuses for illuminating the operating zone which can be observed in an observation mirror, for instance in dentistry, comprise a light source and a lens. The lens serves to concentrate the light flow toward one end of a light conductor which has its other end disposed at the observation mirror. Because of the high heat production the equipment has to be provided with a relatively bulky casing. This casing usually must contain also fan means. The light-generating device will therefore be of comparatively great volume and heavy weight so that it cannot be placed at the operating table but has to be mounted spaced therefrom. This is why long light conductors have to be used, which implies loss of light in transmitting the light from the apparatus to the mirror. The light conductor is disposed on the outer side of the mirror stem, and the cross-sectional area of the light conductor must be kept rather small as the mirror stem will otherwise be too thick. This further restricts the light transmitting possibilities. The end surface of the light conductor is so formed that the light emitted strikes the operating zone at such an angle that the zone can only be observed in the mirror with a disadvantageous and inconvenient location of the observer's eye.

The present invention has for its object to provide an apparatus in which the disadvantages outlined above have been eliminated. According to the invention, the light-generating means comprises a light source placed at one focal point of a cold-light reflector which is part of an ellipsoid, a planar cold-light mirror being provided between said focal point and the other focal point of the ellipsoid and making an angle with the axis of the ellipsoid such that visible light is reflected toward a secondary focal point positioned outside the maximum focusing cone of the reflector, one end of the light conductor being arranged at said secondary focal point, the cold-light reflector and the cold-light mirror permitting the radiant heat to escape from the light-generating means, and the other end of the light conductor cooperates with the reflecting means, the surface of which makes an angle with the longitudinal direction of the stem of the observation mirror such that the light coming from the reflecting means strikes the operating zone, said angle being so selected relative to the angle the observation mirror makes with the longitudinal direction of the stem that the operating zone becomes visible in the observation mirror.

The invention will now be more fully described hereinbelow with reference to the accompanying drawing in which.

Figure 1:
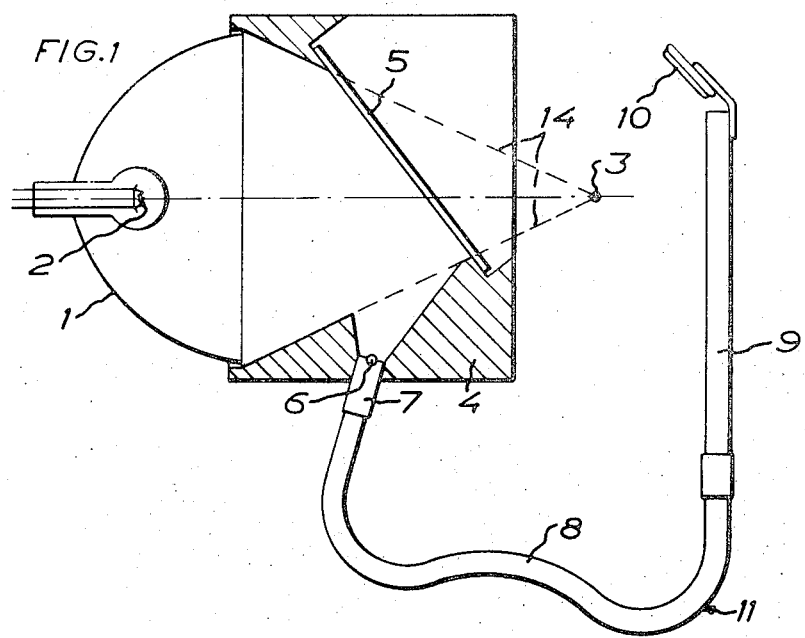
FIG. 1 shows the fundamental design of the apparaus.

The light-generating means comprises a cold-light reflector 1, which is formed as part of an ellipsoid. The light source 2 is positioned at one focal point of the ellipsoid. A planar cold-light mirror 5 is provided between the one focal point of the ellipsoid where the light source 2 is positioned and the other focal point 3 of the ellipsoid. Said cold-light mirror makes an angle with the axis of the ellipsoid such that the maximum focusing flow of visible light is reflected toward a secondary focal point 6 which lies outside the cone 14 formed by the light flow. The reflector 1 and the mirror 5 thus reflect the visible light but permit radiant heat to pass so that it can readily be led away from the casing 4 of the light-generating means.

One end 7 of the light conductor 11 is arranged at a secondary focal point 6. No fan devices are required because of the favourable possibilities of leading away heat, whereby the casing can be given reduced dimensions. As a consequence, the light-generating means can be placed at the operating table. This in turn implies that the flexible portion 8 of the light conductor 11 can be made short, thus diminishing loss of light.

Figure 2:
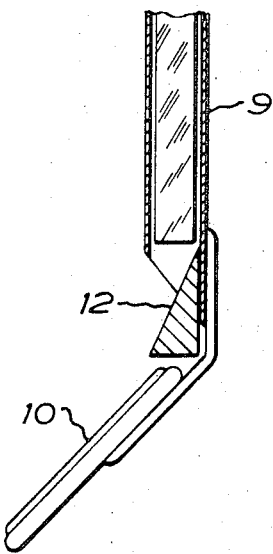
FIGS. 2 and 3 show different embodiments of the end of the light conductor at the observation mirror.
Figure 3:
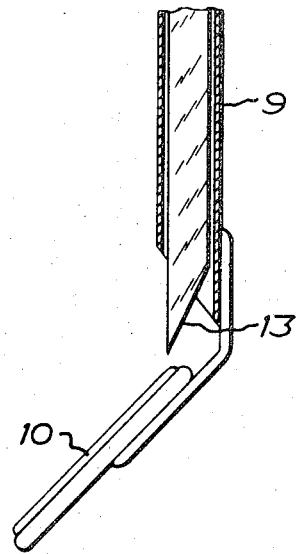

The light conductor 11 is disposed in the stem 9 of the observation mirror 10; it can therefore be given a larger cross-sectional area, making it possible to transmit a greater amount of light. The other end of the light conductor 11 is situated directly opposite the mounting of the mirror 10 on the mirror stem 9. Reflecting means which can be given different configurations, as shown in FIGS. 2 and 3, is provided at the other end of the light conductor 11. The reflecting means has a surface which makes an angle with the longitudinal direction of the stem 9 such that the reflected light strikes the operating zone, the angle being so selected in relation to the angle the observation mirror 10 makes with the longitudinal direction of the stem 9 that the operating zone becomes visible in the observation mirror 10. In the embodiment shown in FIG. 2 the light conductor terminates in an end surface which is at right angles to the longitudinal direction of the stem 9. A planar mirror 12 is disposed adjacent the end surface and makes the desired angle with the longitudinal direction of the stem 9. FIG. 3 shows an embodiment in which the light conductor has been formed with an oblique end surface 13. This end surface 13 makes the desired angle with the longitudinal direction of the stem 9.

The invention thus provides an apparatus which does not require any fan means but can be given such dimensions that it can be placed at the operating table. Moreover, the light conductor has a short length and a large cross-sectional area for the transmission of a large amount of light. The mirror surface at the end of the light conductor in the observation mirror besides provides a correct illumination of the operating zone, making it possible to observe the said zone in the mirror in the best manner conceivable.

What we claim and desire to secure by Letters Patent is:

1. An apparatus for illuminating an operating zone which is observed by means of an observation mirror of the type having a stem, use being made of light-generating means from which the light is transmitted to the operating zone over a light conductor and reflecting means separate from the observation mirror, wherein the light-generating means comprises a light source placed at one focal point of a cold-light reflector which is part of an ellipsoid, a planar cold-light mirror being provided between said focal point and the other focal point of the ellipsoid and making an angle with the axis of the ellipsoid such that visible light is reflected toward a secondary focal point positioned outside the maximum focusing cone of the reflector, one end of the light conductor being arranged at said secondary focal point, the cold-light reflector and the cold-light mirror permitting the radiant heat to escape from the light-generating means, and the other end of the light conductor cooperates with the reflecting means, the surface of which makes an angle with the longitudinal direction of the stem of the observation mirror such that the light coming from the reflecting means strikes the operating zone, said angle being so selected relative to the angle the observation mirror makes with the longitudinal direction of the stem that the operating zone becomes visible in the observation mirror.

2. An apparatus as claimed in claim 1, wherein the reflecting means is a separate light-reflecting mirror disposed at the end of the light conductor.

3. An apparatus as claimed in claim 1, wherein the reflecting means is an oblique reflecting end surface on the light conductor proper.

4. An apparatus as claimed in any one of claims 1, wherein the light conductor is enclosed in the stem of the observation mirror.

* * * * *